(12) United States Patent
Liu et al.

(10) Patent No.: US 11,347,778 B2
(45) Date of Patent: May 31, 2022

(54) SCALE-OUT INDEXING FOR A DISTRIBUTED SEARCH ENGINE

(71) Applicant: EMC IP Holding Company LLC, Hopkinton, MA (US)

(72) Inventors: Cherami Min Liu, Shanghai (CN); Scott Ming Zhang, Shanghai (CN); Jing Yu, Shanghai (CN); Bruce Ke Zhao, Shanghai (CN); Kunal Ruvala, Mumbai (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 798 days.

(21) Appl. No.: 16/172,019

(22) Filed: Oct. 26, 2018

(65) Prior Publication Data

US 2020/0134085 A1  Apr. 30, 2020

(51) Int. Cl.
*G06F 16/00* (2019.01)
*G06F 16/31* (2019.01)
*G06F 16/16* (2019.01)
*G06F 16/27* (2019.01)

(52) U.S. Cl.
CPC .......... *G06F 16/328* (2019.01); *G06F 16/162* (2019.01); *G06F 16/278* (2019.01); *G06F 16/325* (2019.01)

(58) Field of Classification Search
CPC .... G06F 16/328; G06F 16/162; G06F 16/325; G06F 16/278
USPC ........................................................ 707/696
See application file for complete search history.

(56) References Cited

U.S. PATENT DOCUMENTS

| 10,102,228 | B1 * | 10/2018 | Huang | ................. G06F 16/2228 |
| 10,216,768 | B1 * | 2/2019 | Huang | .................... G06F 16/21 |
| 2010/0195417 | A1 * | 8/2010 | Ogasawara | ......... G11C 11/4091 |
| | | | | 365/189.11 |
| 2012/0159114 | A1 * | 6/2012 | Egger | ................. G06F 9/30098 |
| | | | | 711/203 |
| 2016/0055143 | A1 * | 2/2016 | Goel | ..................... G06F 16/328 |
| | | | | 715/229 |
| 2017/0031752 | A1 * | 2/2017 | Cilfone | ................. G06F 21/645 |

\* cited by examiner

*Primary Examiner* — Monica M Pyo
(74) *Attorney, Agent, or Firm* — Womble Bond Dickinson (US) LLP

(57) ABSTRACT

Methods and systems for data indexing are disclosed. According to some embodiments, an index is split into a number of slots based on a slot power value. Each of the slots is assigned with a slot number. A first subset of the slots is allocated to a first shard mapped to the index. A second subset of the slots is allocated to a second shard mapped to the index. The first subset and the second subset are respectively allocated to the first shard and the second shard based on a shard-slot mapping.

21 Claims, 10 Drawing Sheets

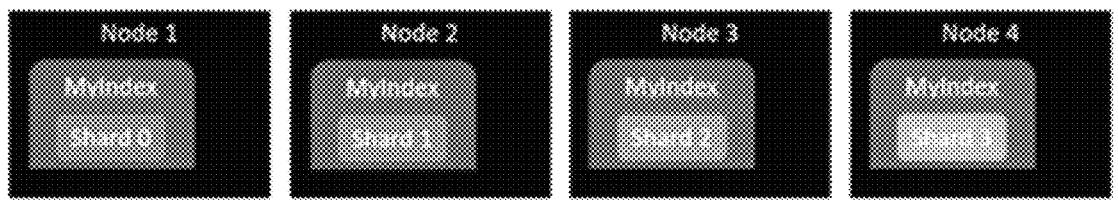
FIG. 1A
(Prior Art)
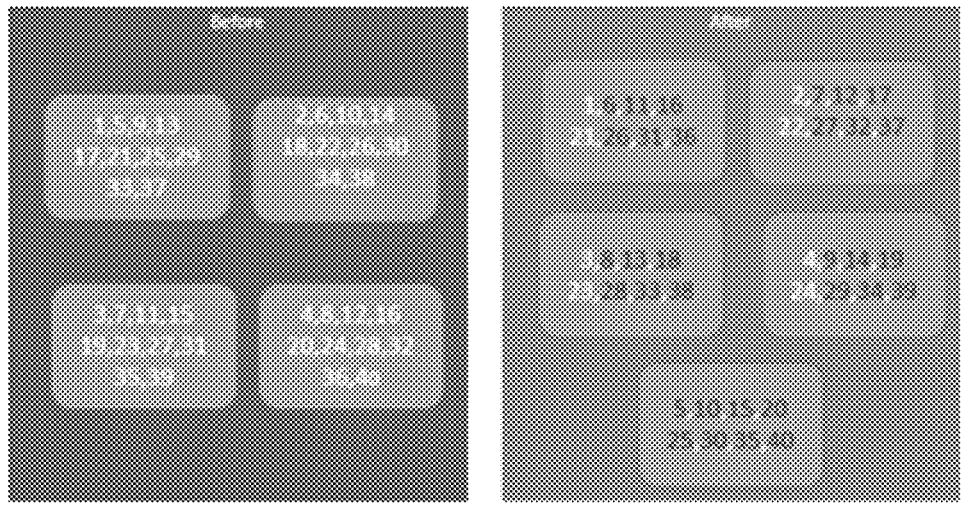
FIG. 1B
(Prior Art)
|         | 4->5 | 20->21 | 99->100 |
|---------|------|--------|---------|
| 1000    | 80   | 94     | 90.1    |
| 10000   | 80   | 95.2   | 98.02   |
| 100000  | 80   | 95.22  | 98.911  |
| 1000000 | 80   | 95.238 | 98.9902 |
FIG. 1C
(Prior Art)

US 11,347,778 B2

SCALE-OUT INDEXING FOR A DISTRIBUTED SEARCH ENGINE

FIELD OF THE INVENTION

Embodiments of the present invention relate generally to a distributed search framework. More particularly, embodiments of the invention relate to scale-out indexing for a distributed search engine.

BACKGROUND

Sizing has always been an issue for indexing in a search engine (e.g., Elasticsearch). Modern search engine can distribute a single index to many pieces called shards. However, this does not resolve the sizing issue. A shard refers to a partition of data in a database or search engine. An index refers to a logical namespace which maps to one or more shards (or primary shards) and may have one or more replica shards. As an example, referring to FIG. 1A, each of Nodes 1-4 represents a node (e.g., host or server) in a distributed search system. Each node includes an index (labelled as "MyIndex"), and the index is mapped to a shard (respectively Shard 0 . . . Shard 3).

When a user needs to create an index to host data, the user does not know how large the index would eventually expand. If the index (or shard) expands too large, then query performance would become an issue. For example, if the shard size exceeds 20 GB, query performance would decrease linearly. Due to the nature of sharding algorithm, once an index is created, adding even one additional shard would cause resharding of all data. For example, referring now to FIG. 1B, which is a block diagram illustrating a comparison when the number of shards increases from four to five, the outer rectangular block (labelled "Before") represents an index. Each block in the index represents a shard, and each number in the shard represents an indexed document. As shown, in the "Before" block, there are four shards. When the number of shards increases to five shards (as shown in the "After" block), about 80% of the data needs to be resharded (as shown by the black numbers).

FIG. 1C is a table illustrating the data reshard percentage for different cases when the number of shards increases. As can be seen in FIG. 1C, additional shards and additional documents would cause more data to be resharded. Therefore, most systems would not allow the number of shards to be changed dynamically due to resharding.

BRIEF DESCRIPTION OF THE DRAWINGS

Embodiments of the disclosure are illustrated by way of example and not limitation in the figures of the accompanying drawings in which like references indicate similar elements.

FIG. 1A is a block diagram illustrating a number of nodes in a distributed search system.

FIG. 1B is a block diagram illustrating a comparison when the number of shards increases from four to five.

FIG. 1C is a table illustrating the data reshard percentage for different cases when the number of shards increases.

DETAILED DESCRIPTION

Figure 2:
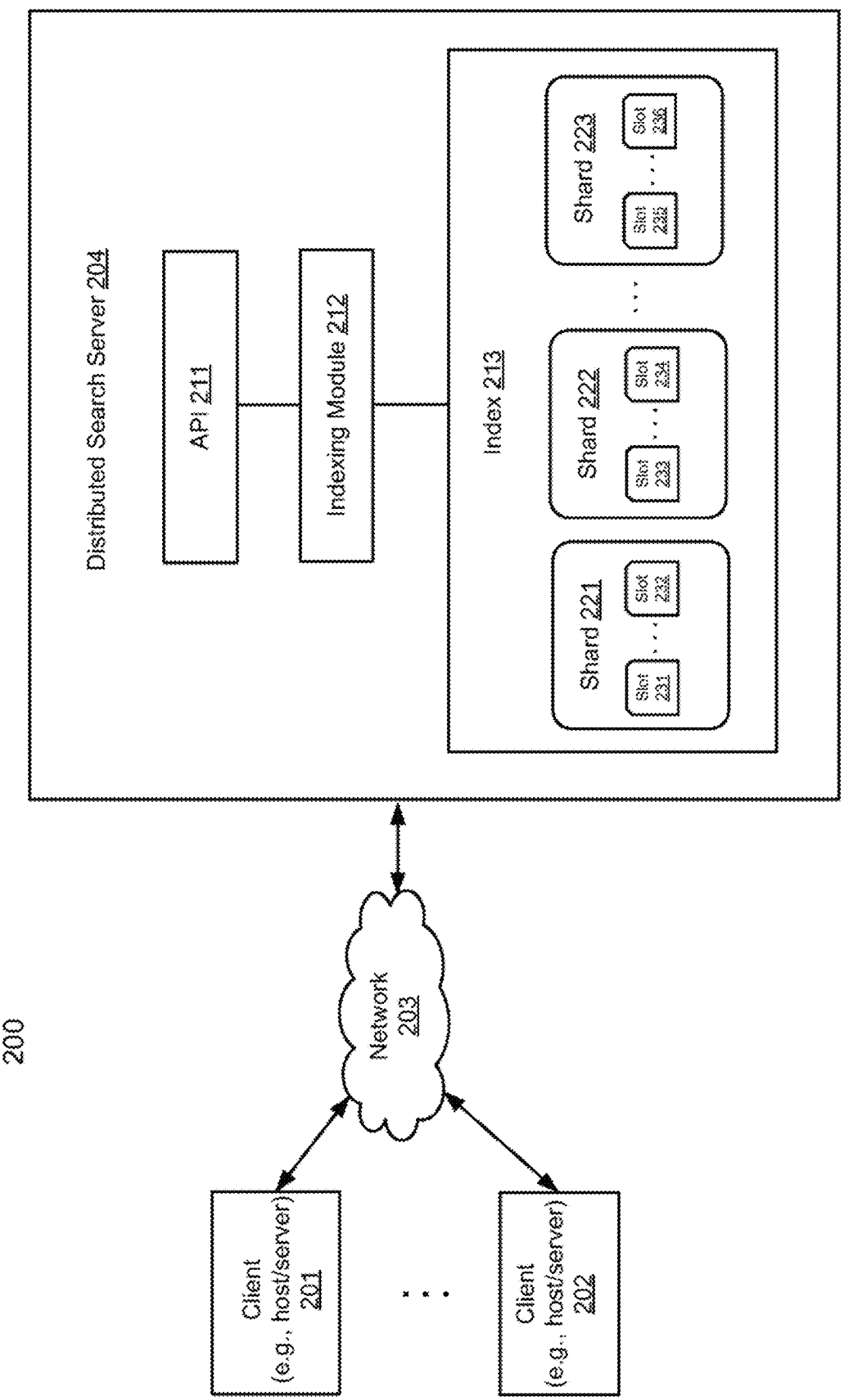
FIG. 2 is a block diagram illustrating an example of a distributed search system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one embodiment, an index is split into a number of slots based on a slot power value. Each of the slots is assigned with a slot number. A first subset of the slots is allocated to a first shard mapped to the index. A second subset of the slots is allocated to a second shard mapped to the index. The first subset and the second subset are respectively allocated to the first shard and the second shard based on a shard-slot mapping.

In one embodiment, the first subset of the slots includes a first slot assigned with a first minimum slot number, and a second slot assigned with a first maximum slot number. In one embodiment, the second subset of the slots includes a third slot assigned with a second minimum slot number, and a fourth slot assigned with a second maximum slot number.

In one embodiment, in response to a request to index a document, one of the slots is determined to store the document by performing a modulus operation between a hash value of a document identifier (ID) of the document and a total number of slots to determine the slot number assigned to the slot to store the document. In one embodiment, the hash value is represented by a number of bits, and the slot number is identified by some of the bits.

In one embodiment, in response to a request to add a document, whether size of the document exceeds a prefer shard size is determined. The second shard is suspended in response to determining that the size of the document exceeds the prefer shard size. The second shard is copied to produce a third shard, where the third shard is a duplicate shard of the second shard In one embodiment, a first set of existing documents is deleted from the second shard. A second set of existing documents is deleted from the third shard. The third shard is created as a new shard. The second shard is resumed. The slot numbers that host the deleted first set of existing documents are held by the new shard. The slot numbers that host the deleted second set of existing documents are held by the second shard.

In this way, data (or documents) can be scaled out to additional shards to maintain the overall performance, and at the same time, reduce the impact of data reallocating. A user can adjust several key parameters, although default values would work in most cases. The system also collects performance data to improve performance, and after some time, the system can dynamically scale out data seamlessly with optimized threshold.

FIG. 2 is a block diagram illustrating an example of a distributed search system according to one embodiment. Referring to FIG. 2, system 200 includes, but is not limited to, one or more client systems 201-202 communicatively coupled to a distributed search server 204 over network 203. Clients 201-202 may be any type of clients such as a host or server, a personal computer (e.g., desktops, laptops, and tablets), a "thin" client, a personal digital assistant (PDA), a Web enabled appliance, a mobile phone (e.g., Smartphone), or a wearable device (e.g., smartwatch), etc. Alternatively, any of clients 201-202 may be a primary storage system (e.g., local data center) that provides storage to other local clients, which may periodically back up the content stored therein to a backup storage system (e.g., a disaster recovery site or system). Network 203 may be any type of networks such as a local area network (LAN), a wide area network (WAN) such as the Internet, a fiber network, a storage network, a cellular network, or a combination thereof, wired or wireless. Clients 201-202 may be in physical proximity or may be physically remote from one another.

With continued reference to FIG. 2, distributed search server 204 may include an application programming interface (API) 211 and an indexing module 212 (also referred to as indexing logic or indexing engine). Server 204 may include or represent any type of servers or a cluster of one or more servers. Server 204 may be referred to as a node that is part of a cluster. A cluster refers to as a collection of nodes (e.g., hosts or servers) that shares information. In one embodiment, server 204 may store data that any of clients 201-202 may query, and participate in cluster indexing and search capabilities. Server 204 may distribute shards within indices to different nodes (e.g., host or servers) in a shared cluster. In one embodiment, server 204 may replicate its indices across other nodes, thereby generating replica shards, as a backup mechanism. In one embodiment, server 204 may be implemented as part of a scalable index and search appliance, such as, for example DellEMC™ Data Protection Search or the like.

API 211 may be configured to receive an incoming request from any of clients 201-202 to perform one or more functions. For example, the request may include a request to create an index (e.g., index 213), or a request to ingest documents. A document refers to as a basic unit of information that can be indexed, which may be represented as a row in a table. In one embodiment, the request may be a Hypertext Transfer Protocol (HTTP) request. In one embodiment, API 211 may be a representational state transfer (REST) API.

After processing the request, API 211 may invoke indexing module 212 to perform one or more functions (e.g., an indexing or a searching function) based on the request. In one embodiment, indexing module 212 may create index 213 that maps to shards 221-223. In one embodiment, indexing module 212 may automatically expand the capacity of index 213 in accordance with a slot allocation system. For example, indexing module 212 may split (or divide) index 213 into a total number of slots (also referred to as logical slots), for example $2^N$ slots where N is an integer greater than or equal to 0. In one embodiment, the total number of slots may be predetermined, for example, by a user. In one embodiment, the slots may be divided up and allocated to a number of shards. For example, each of the shards 221-223 may hold one or more of the slots (e.g., a subset of the slots) from a minimum slot number to a maximum slot number. For example, in FIG. 2, shard 221 holds slots 231-232, shard 222 holds slots 233-234, and shard 223 holds slots 235-236. Each of shards 221-223 may hold the same or different number of slots.

Figure 3A:
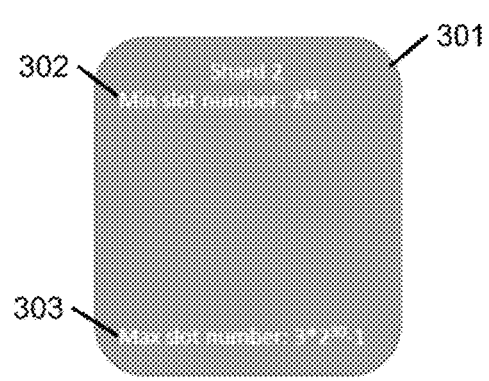
FIGS. 3A-3C are block diagrams illustrating an example of an index splitting system according to one embodiment.
Figure 3B:
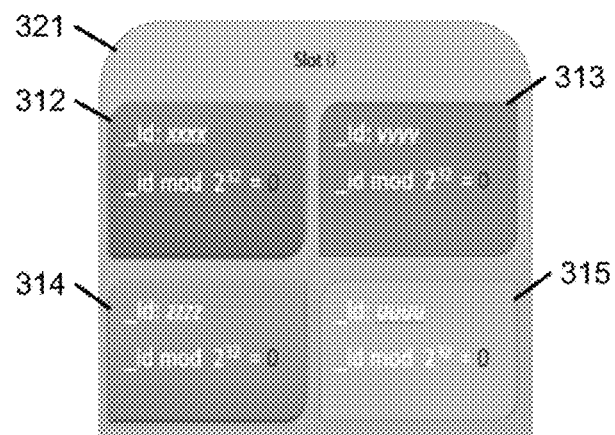
Figure 3C:
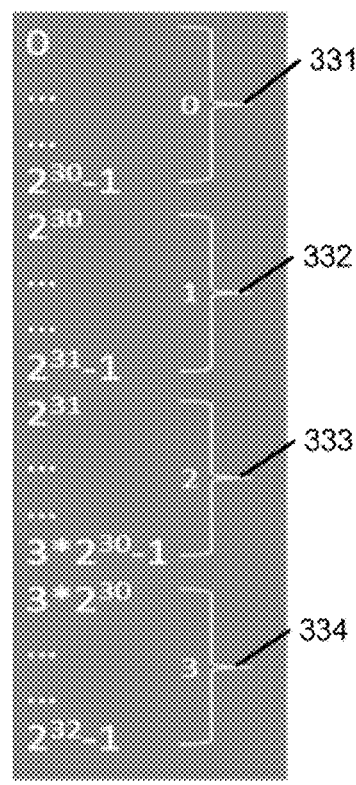

Referring now to FIGS. 3A-3C, which are block diagrams illustrating an example of an index splitting system according to one embodiment, an index (e.g., index 213) may be split into $2^{32}$ slots (i.e., slot 0 ... slot $2^{32}-1$), as an example. In the example of FIG. 3A, shard 301 holds slot 302 (which is assigned with a minimum slot number of $2^{31}$) to 303 (which is assigned with a maximum slot number of $3*2^{30}-1$). When a document is added to an index (e.g., index 213), or a request to index a document is received for example by API 211, a hash (or hash value) of a document identifier (ID) associated with the document may be calculated using a hash function. Such hash function is generally well known to people of skill in the art. The hash value may be modulo (also referred to as mod) by the total number of slots (in this case, $2^{32}$ in the example of FIGS. 3A-3C) to produce the slot number to store or index the document. For example, in FIG. 3B, documents 312-315 are all stored in slot 321 (labelled as "Slot 0") since the respective results of the modulus operation between the hash values of their document IDs and $2^{32}$ are all "0". Based on a shard-slot mapping (as shown in FIG. 3C), it can be determined which shard the document (e.g., documents 312-315) is stored in. For instance, in FIG. 3C, the mapping (which may be predetermined), maps shard 331 (labelled as "0") to slots 0 ... $2^{30}-1$, shard 332 (labelled as "1") to slots $2^{30}$ ... $2^{31}-1$, shard 333 (labelled as "2") to slots $2^{31}$ ... $3*2^{30}-1$, and shard 334 (labelled as "3") to slots $3*2^{30}$ ... $2^{32}-1$. Based on the examples of FIGS. 3A-3C, documents 312-315 are stored in slot 321 (or Slot 0).

Figure 4A:
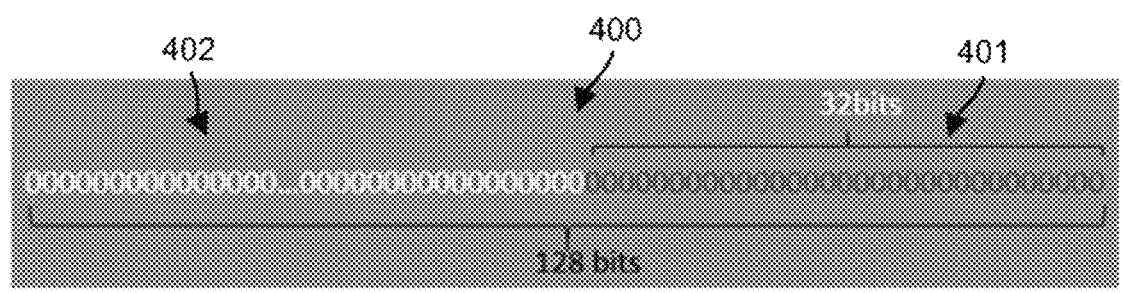
FIGS. 4A-4B are block diagrams illustrating an example of a slot allocation system according to one embodiment.
Figure 4B:
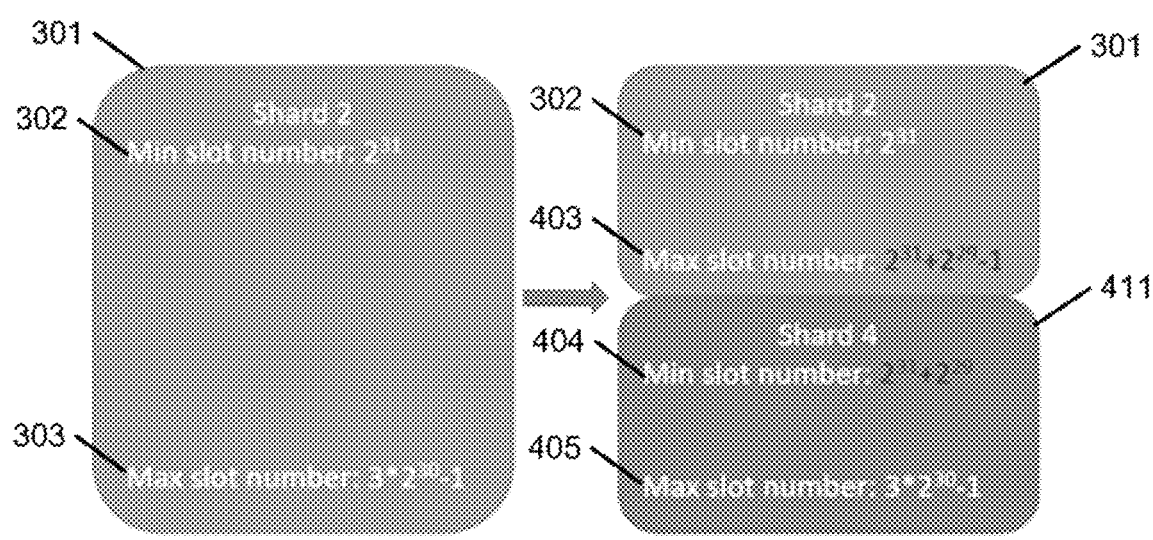

FIGS. 4A-4B are block diagrams illustrating an example of a slot allocation system according to one embodiment. Referring to FIG. 4A, a hash value 400 may be represented by a number of bits (128 bits in the example of FIG. 4A). In other words, the hash value may be up to $2^{128}$. In this case, the slot number 401 of a particular slot (e.g., any of slots 231 ... 236) may be represented by some of the bits of the hash (e.g., at least 32 bits). In this example, each slot can host $2^{96}$ unique hash values 402, where each hash value corresponds to a unique document. A document binds with a slot number, and therefore, when a shard needs to be split, the shard-slot mapping (e.g., the mapping shown in FIG. 3C) may be updated to reallocate the slots and reassign the slot numbers.

Referring now to FIG. 4B, shard 301 (labelled as "Shard 2") initially holds slots 302-303, as previously described. In this case, shard 301 is split at an intermediate slot assigned with an intermediate slot number to create additional shard 411. As such, the shard-slot mapping may be updated to reallocate the slots and reassign the slot numbers such that shard 301 holds slot 302 to slot 403 (which is assigned with a new maximum slot number of $2^{31}+2^{29}-1$), and shard 411 holds slot 404 (which is assigned with a minimum slot number of $2^{31}+2^{29}$) to slot 405 (which is assigned with a maximum slot number of $3*2^{30}-1$).

Figure 5A:
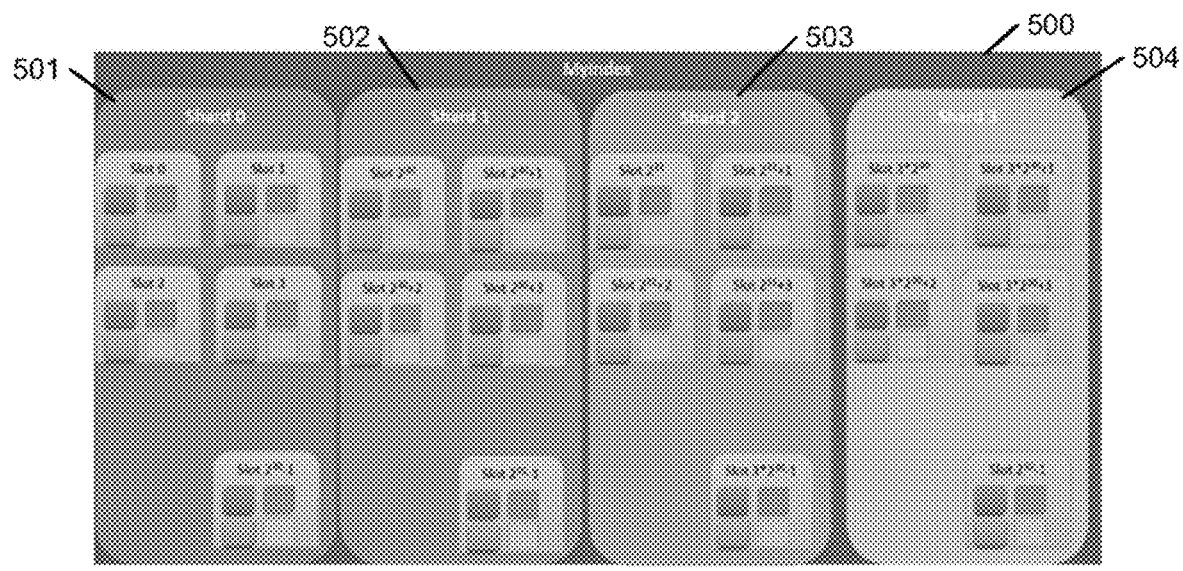
FIGS. 5A-5C are block diagrams illustrating another example of a slot allocation system according to one embodiment.
Figure 5B:
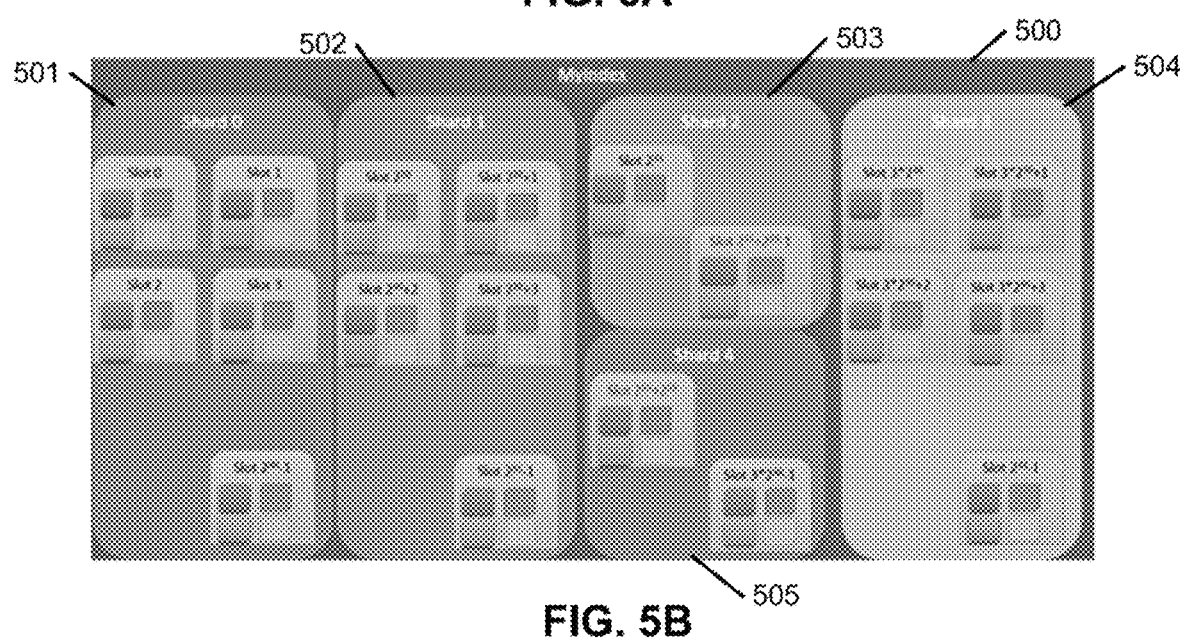
Figure 5C:
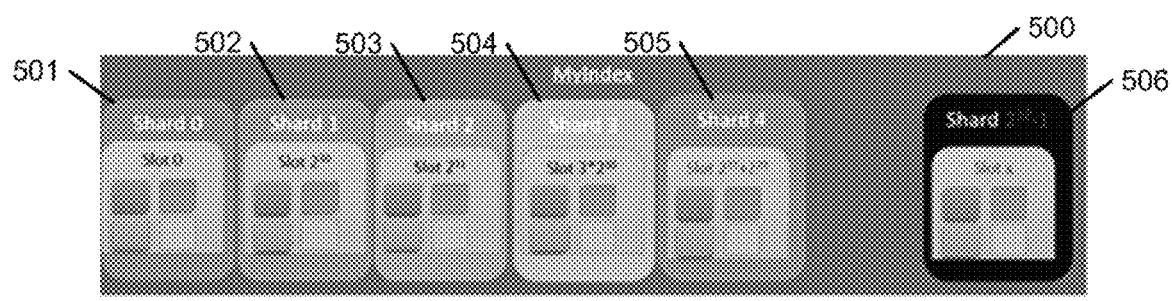

FIGS. 5A-5C are block diagrams illustrating another example of a slot allocation system according to one embodiment. Referring to FIG. 5A, index 500 may be mapped to shards 501-504. In the example of FIG. 5A, each shard may hold or host $2^{30}$ slots. As shown, shard 501 hosts slot 0 to slot $2^{30}-1$, shard 502 hosts slot $2^{30}$ to slot $2^{31}-1$, shard 503 hosts slot $2^{31}$ to slot $3*2^{30}-1$, and shard 504 hosts slot $3*2^{30}$ to slot $2^{32}-1$.

Referring now to FIG. 5B, suppose that shard 503 is full, then shard 505 may be added to index 500 to alleviate the data load from shard 503. Accordingly, after the shard-slot mapping is updated, shards 501-502 and 504 continue to host the same slots, as previously described. However, shard 503 now hosts slot $2^{31}$ to slot $2^{31}+2^{29}-1$, and shard 505 hosts slot $2^{31}+2^{29}$ to slot $3*2^{30}-1$. In other words, shards 501-502 and 504 still host $2^{30}$ slots and keep exactly the same, but shards 503 and 505 would only host $2^{29}$ slots. This is half of the number of slots that shard 503 previously hosted (e.g., as shown in FIG. 5A).

Referring now to FIG. 5C, assuming that a shard can only host a maximum amount of data (e.g., 20 GB), once the maximum amount of data is exceeded, the shard may split as previously described with respect to shards 503 and 505. If the index size continues to increase, however, a shard may eventually host only one slot. That is, $2^{32}$ shards (e.g., shards 501-506) may be needed for index 500. In this case, index 500 can at most host $2^{32}*20$ GB of data, which is 80 exabyte (EB) in total. This is generally large enough to handle most applications. In FIG. 5C, notice that the shard number and slot number are not equal even though one shard only hosts one slot. This is dependent on the sequence of shard splitting.

Referring back to FIG. 5B, in one embodiment assuming each shard can host 20 GB of data, when a shard split is needed, about 10 GB of data may be reallocated or moved. It is generally easy to measure the amount of time needed to reallocate such amount of data. More specifically, when a shard is split (e.g., shard 503), in one embodiment, only the splitting shard may be suspended instead of the entire index 500. Shards 501-502 and 504 are still fully operational. In this way, performance impact to index 500 can be reduced. To further reduce performance impact to index 500, the split can be restricted to execute in a sequential order. That is, if one shard is splitting, then another shard cannot split until a next shard splitting window is opened.

In one embodiment, while the system (e.g., server 204 of FIG. 2) is running, performance data may be collected, for example, by index module 212 or a separate data collection module on server 204. Performance data may include information of deleted documents from a particular shard, and information of shards that are moved to another node. This way, based on the performance data, server 204 may estimate a suspension time to suspend a shard. Because the reallocation of data may create a duplicate shard, about half of the documents may be deleted from the suspended shard, and about another half of the documents may be deleted from the duplicate shard. In one embodiment, server 204 may also collect an actual suspension time for better estimation when a shard split is needed.

In one embodiment, when a document is indexed, metadata or a field may be added to the document schema, such as a slot (or slot number). This way, delete operations may be avoided, and instead, only a shard copy operation is needed. Meanwhile, query behavior may need to be changed to exclude documents from result where slot value (or slot number) is not in the shard's slot range.

In one embodiment, index parameters may be predefined when indexing is performed. For example, a minimum shard size may be defined (e.g., by a user) in order to prevent the creation of too many small shards that would harm the overall performance. A maximum shard size may also need to be defined in order to prevent large shards that decrease search performance.

Accordingly, the predefined index parameters may include:
slotpower: slot power of 2. This value is 32 by default (e.g., $2^{32}$),
    minsize: minimum shard size, by default it is 2 GB,
    maxsize: maximum shard size, by default it is 40 GB,
    prefersize: prefer shard size, which is the size system can start to split shard. The system would calculate this size based on collected performance data, by default it is 20 GB,
    raspeed: reallocation speed, if reallocation is performed 10 GB data would require 10 seconds, and therefore, it is 1 GB/s,
    maxsustime: maximum shard suspend time, by default it is 30 seconds.

As an example, if one cluster needs 40 seconds to reallocate 10 GB of data, then raspeed is 0.25 GB/s, and maxsustime keep default. Then the system (e.g., server 204) would adjust prefersize to 15 GB to match the expectation of maxsustime:

$$prefersize=maxsustime*2*raspeed$$

When a shard split occurs, the system can adjust the raspeed accordingly to allow the system to better handle a next split.

Figure 6:
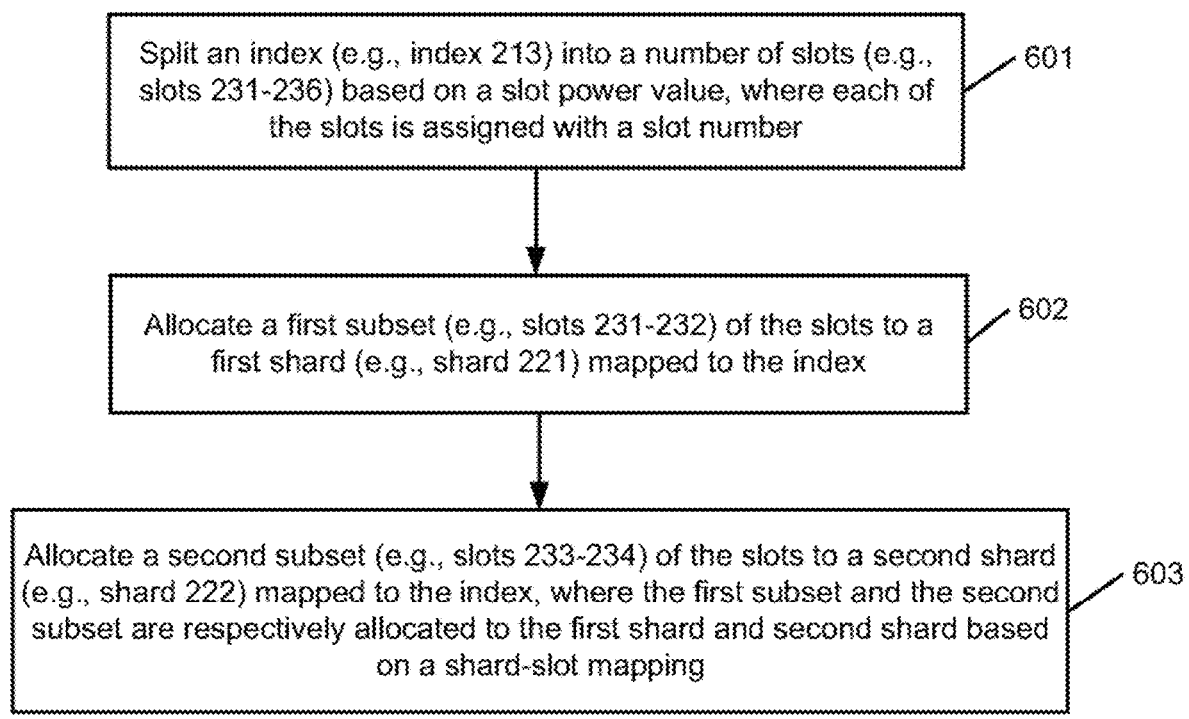
FIG. 6 is a flow diagram illustrating a method of data indexing according to one embodiment.

FIG. 6 is a flow diagram illustrating a method of data indexing according to one embodiment. Process 600 may be performed by processing logic that includes hardware (e.g. circuitry, dedicated logic, etc.), software (e.g., embodied on a non-transitory computer readable medium), or a combination thereof. For example, process 600 may be performed by indexing module 212 of FIG. 2.

Referring to FIG. 6, at block 601, the processing logic splits an index (e.g., index 213) into a number of slots (e.g., slots 231-236) based on a slot power value, where each of the slots is assigned with a slot number. At block 602, the processing logic allocates a first subset (e.g., slots 231-232) of the slots to a first shard (e.g., shard 221) mapped to the index. At block 603, the processing logic allocates a second subset (e.g., slots 233-234) of the slots to a second shard (e.g., shard 222) mapped to the index, where the first subset and the second subset are respectively allocated to the first shard and the second shard based on a shard-slot mapping.

Figure 7:
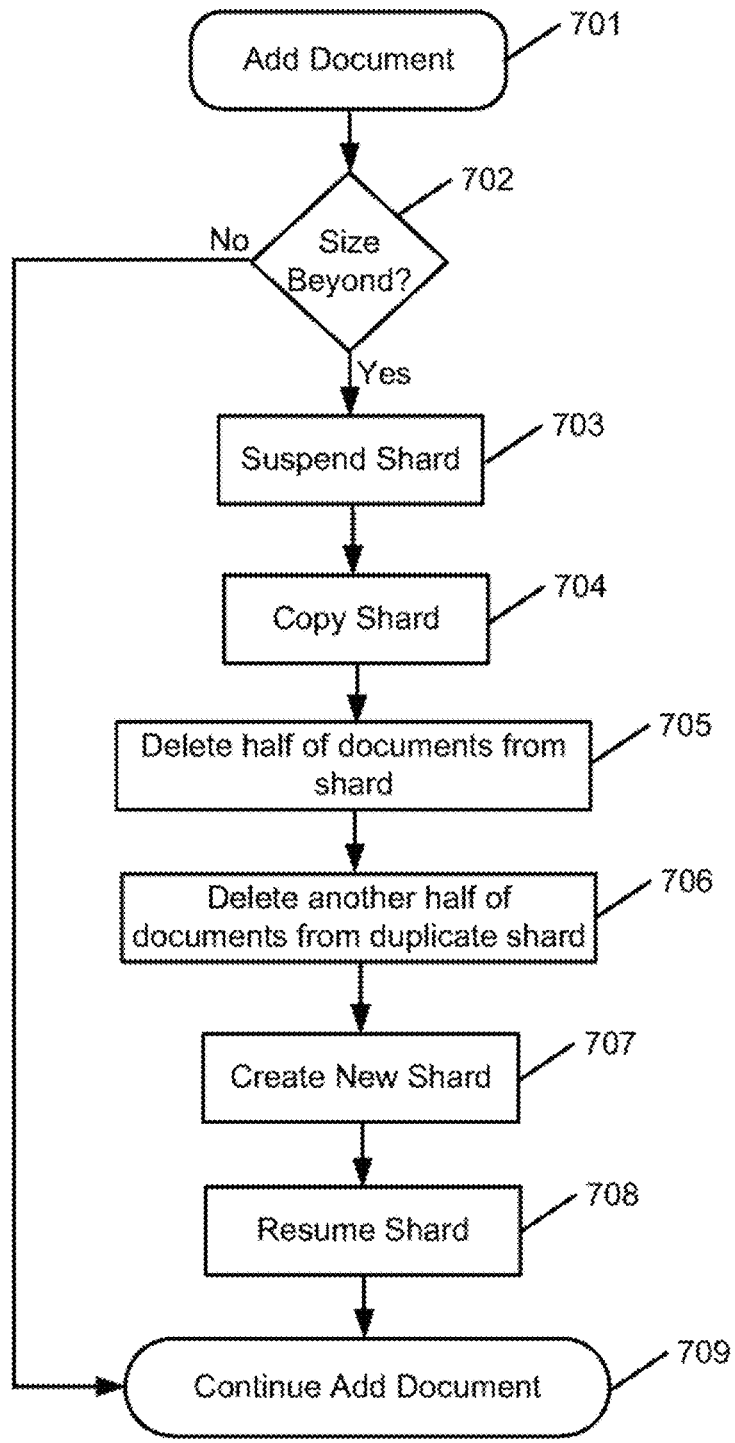
FIG. 7 is a flow diagram illustrating another method of data indexing according to one embodiment.

FIG. 7 is a flow diagram illustrating another method of data indexing according to one embodiment. Process 700 may be performed by processing logic that includes hardware (e.g. circuitry, dedicated logic, etc.), software (e.g., embodied on a non-transitory computer readable medium), or a combination thereof. For example, process 700 may be performed by indexing module 212 of FIG. 2.

Referring to FIG. 7, to implement the foregoing index splitting and slot allocation techniques into a search engine (e.g., Elasticsearch), at block 701 when a document is added to a shard (e.g., shard 503), the processing logic checks the size of the document with a prefer shard size. At block 702, if the size of the document is beyond (or exceeds) the prefer shard size, the processing logic continues to block 703. Otherwise, the processing logic continues to block 709. At block 703, the processing logic suspends the shard. As previously described, the processing logic may suspend the shard without suspending the whole index. At block 704, the processing copies the suspended shard (e.g., shard 503) to produce a duplicate shard from the suspended shard. At block 705, the processing logic deletes a first set (e.g., about half) of existing documents from the suspended shard, where the slot numbers that host the deleted documents are held by a new shard. As previously explained with respect to FIG. 5B, when shard 503 is split, it only hosts $2^{29}$ slots, which is half of the number of slots that shard 503 previously hosted (e.g., as shown in FIG. 5A). Therefore, shard 503 only retains half of the documents it originally hosted prior to the split. At block 706, the processing logic deletes a second set (e.g., about another half) of the documents from the duplicate shard, where the slot numbers that host these other deleted documents are held by the suspend shard (e.g., shard 503). At block 707, the processing logic creates the duplicate shard as a new shard (e.g., shard 505) and updates the index (e.g., index 500), which may be based on the minimum shard size and/or maximum shard size. At block 708, the processing logic resumes the suspended shard. At block 709, the processing logic continues to add the document to the shard (e.g., shard 503/505). If there is a subsequent shard splitting, the processing logic continues to add the document and wait for a next window to perform the shard splitting.

Figure 8:
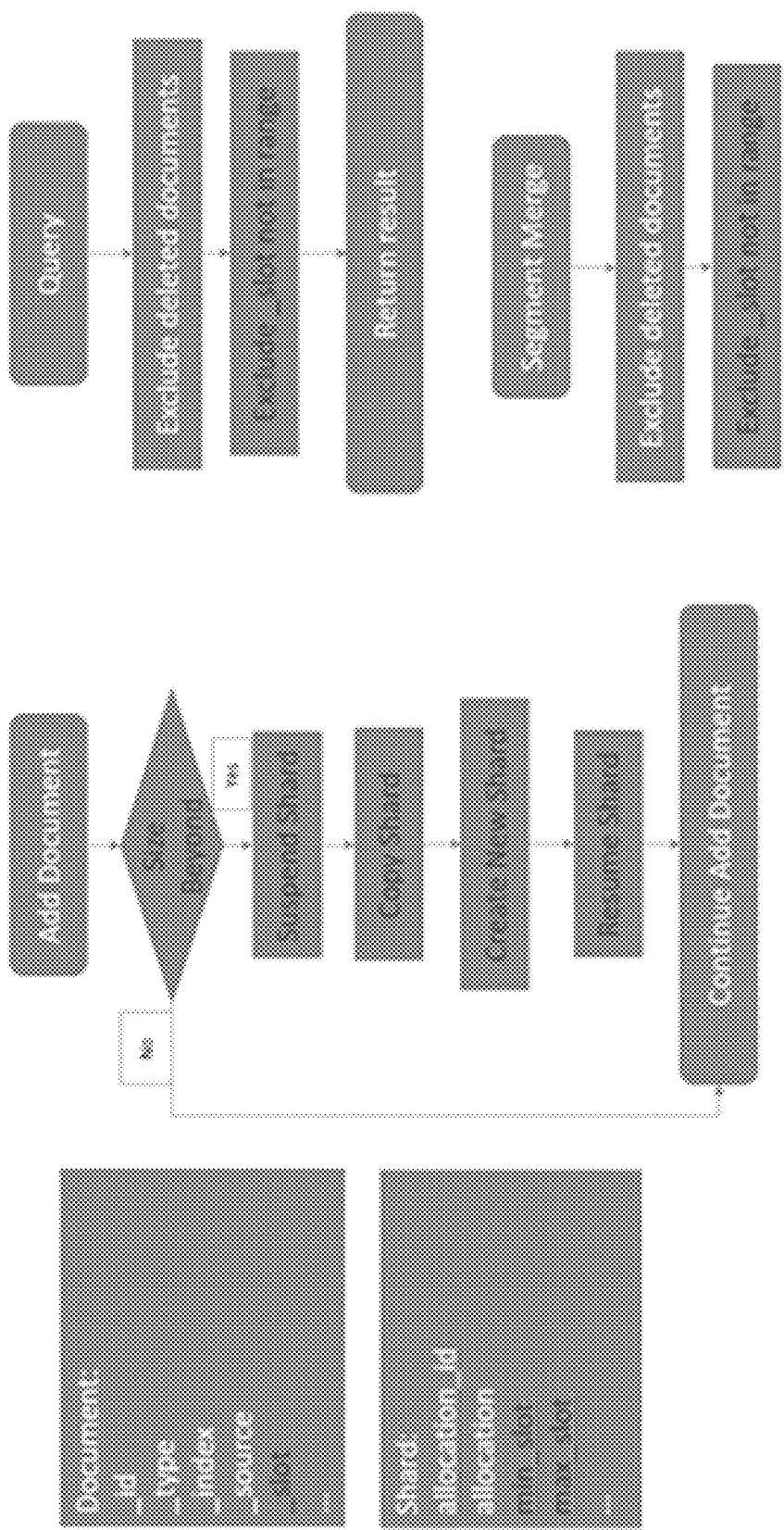
FIG. 8 illustrates flow diagrams of yet another method of data indexing according to one embodiment.
Figure 9:
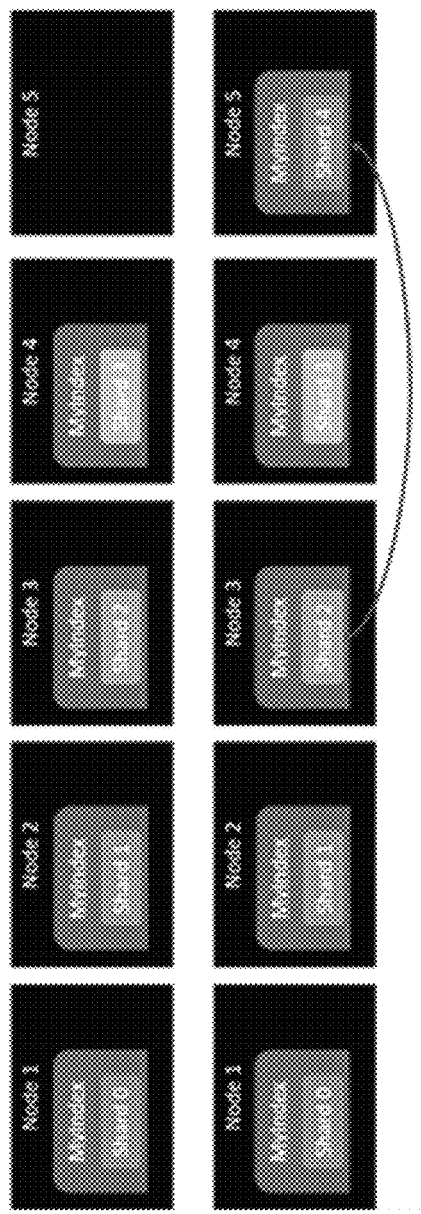
FIG. 9 is a block diagram illustrating a shard allocation system according to one embodiment.

In one embodiment, to optimize the shard splitting, deleting the documents from the suspended shard and duplicate shard may be avoided. Instead, the schema of a document may be modified to add a field, e.g., slot. Accordingly, the process to index a document would be in accordance with the flow diagrams as shown in FIG. 8. This would result in a shard allocation illustrated in FIG. 9, where Shard 2 from Node 2 is split into Shard 4 in Node 5 in a distributed search system.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
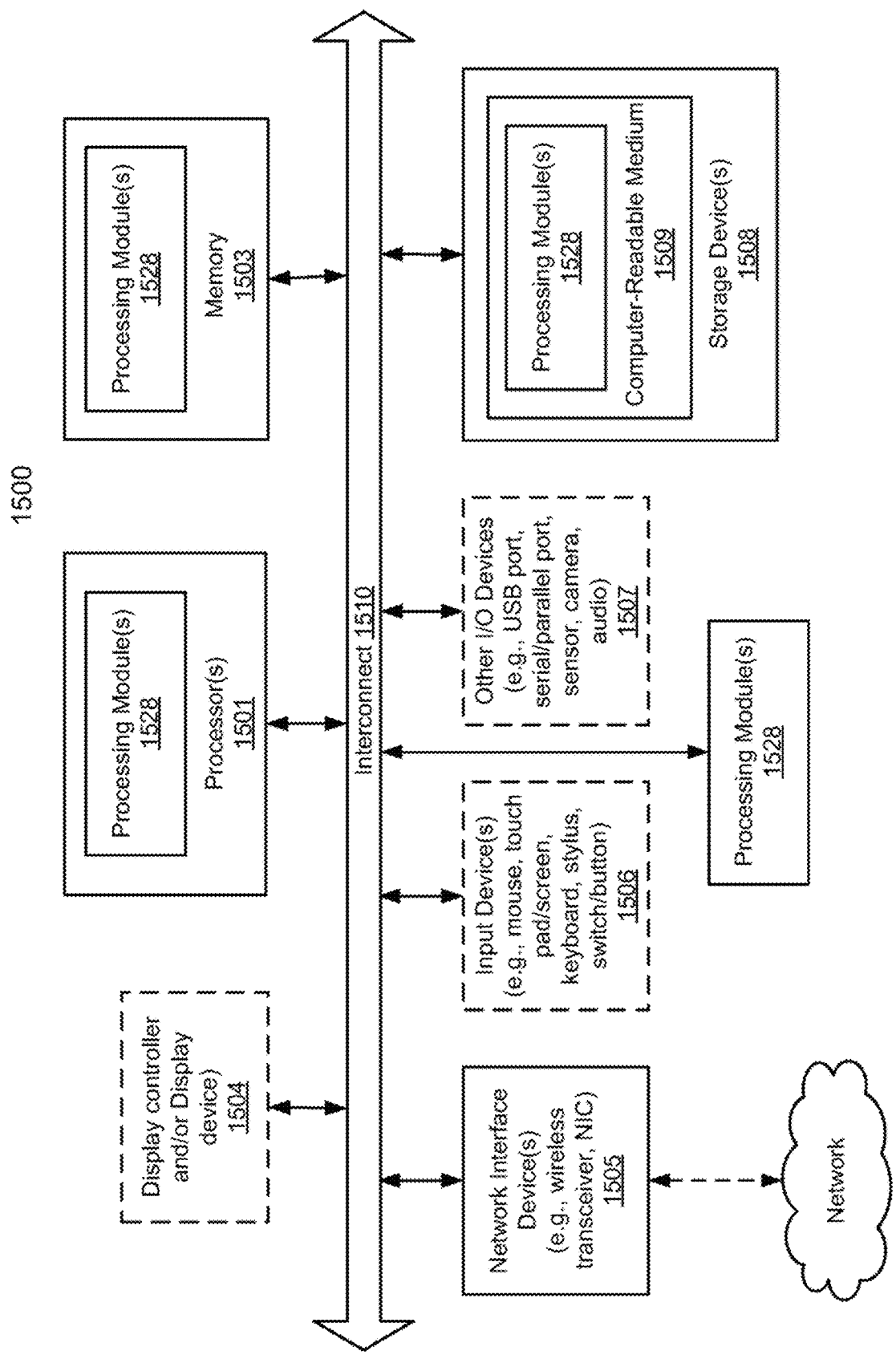
FIG. 10 is a block diagram illustrating a data processing system according to one embodiment.

FIG. 10 is a block diagram illustrating an example of a data processing system which may be used with one embodiment. For example, system 1500 may represents any of data processing systems described above performing any of the processes or methods described above. In one embodiment, system 1500 may be implemented as part of clients 201-202 or distributed search server 204. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, indexing module 212. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of data indexing, comprising:
    splitting, by a server, an index into a plurality of slots based on a slot power value, wherein each of plurality of slots is assigned with a slot number;
    allocating, by the server, a first subset of the slots to a first shard mapped to the index;
    allocating, by the server, a second subset of the slots to a second shard mapped to the index;
    in response to a request to add a document, determining, by the server, whether size of the document exceeds a prefer shard size;
    suspending, by the server, the second shard in response to determining that the size of the document exceeds the prefer shard size;
    copying, by the server, the second shard to produce a third shard, wherein the third shard is a duplicate shard of the second shard;
    deleting, by the server, a first set of existing documents from the second shard;
    deleting, by the server, a second set of existing documents from the third shard;
    creating, by the server, the third shard as a new shard;
    resuming, by the server, the second shard; and
    continue adding, by the server, the document to the second shard or the third shard;
    wherein the first subset and the second subset are respectively allocated to the first shard and the second shard based on a shard-slot mapping.

2. The method of claim 1, wherein
    the first subset of the slots includes a first slot assigned with a first minimum slot number, and a second slot assigned with a first maximum slot number,
    the second subset of the slots includes a third slot assigned with a second minimum slot number, and a fourth slot assigned with a second maximum slot number.

3. The method of claim 1, further comprising: in response to a request to index a document, determining, by the server, one of the plurality of slots to store the document by performing a modulus operation between a hash value of a document identifier (ID) of the document and a total number of slots to determine the slot number assigned to the slot to store the document.

4. The method of claim 3, wherein the hash value is represented by a plurality of bits, and the slot number is identified by some of the plurality of bits.

5. The method of claim 1,
    wherein the slot numbers that host the deleted first set of existing documents are held by the new shard;
    wherein the slot numbers that host the deleted second set of existing documents are held by the second shard.

6. The method of claim 1, wherein the prefer shard size is determined based on a maximum shard suspend time and a reallocation speed.

7. The method of claim 1, wherein the plurality of slots comprises $2^N$ slots, wherein N is the slot power value greater than or equal to zero (0).

8. A non-transitory machine-readable medium having instructions stored therein, which when executed by a processor, cause the processor to perform operations, the operations comprising:
    splitting an index into a plurality of slots based on a slot power value, wherein each of plurality of slots is assigned with a slot number;
    allocating a first subset of the slots to a first shard mapped to the index;
    allocating a second subset of the slots to a second shard mapped to the index; in response to a request to add a document, determining whether size of the document exceeds a prefer shard size;
    suspending the second shard in response to determining that the size of the document exceeds the prefer shard size;
    copying the second shard to produce a third shard, wherein the third shard is a duplicate shard of the second shard;
    deleting a first set of existing documents from the second shard;
    deleting a second set of existing documents from the third shard;
    creating the third shard as a new shard;
    resuming the second shard; and
    continue adding the document to the second shard or the third shard;
    wherein the first subset and the second subset are respectively allocated to the first shard and the second shard based on a shard-slot mapping.

9. The non-transitory machine-readable medium of claim 8, wherein
    the first subset of the slots includes a first slot assigned with a first minimum slot number, and a second slot assigned with a first maximum slot number,
    the second subset of the slots includes a third slot assigned with a second minimum slot number, and a fourth slot assigned with a second maximum slot number.

10. The non-transitory machine-readable medium of claim 8, wherein the operations further comprise: in response to a request to index a document, determining one of the plurality of slots to store the document by performing a modulus operation between a hash value of a document identifier (ID) of the document and a total number of slots to determine the slot number assigned to the slot to store the document.

11. The non-transitory machine-readable medium of claim 10, wherein the hash value is represented by a plurality of bits, and the slot number is identified by some of the plurality of bits.

12. The non-transitory machine-readable medium of claim 8,
wherein the slot numbers that host the deleted first set of existing documents are held by the new shard;
wherein the slot numbers that host the deleted second set of existing documents are held by the second shard.

13. The non-transitory machine-readable medium of claim 8, wherein the prefer shard size is determined based on a maximum shard suspend time and a reallocation speed.

14. The non-transitory machine-readable medium of claim 8, wherein the plurality of slots comprises $2^N$ slots, wherein N is the slot power value greater than or equal to zero (0).

15. A data processing system, comprising:
a processor; and
a memory coupled to the processor to store instructions, which when executed by the processor, cause the processor to perform operations, the operations including
splitting an index into a plurality of slots based on a slot power value, wherein each of plurality of slots is assigned with a slot number;
allocating a first subset of the slots to a first shard mapped to the index;
allocating a second subset of the slots to a second shard mapped to the index;
in response to a request to add a document, determining whether size of the document exceeds a prefer shard size;
suspending the second shard in response to determining that the size of the document exceeds the prefer shard size;
copying the second shard to produce a third shard, wherein the third shard is a duplicate shard of the second shard;
deleting a first set of existing documents from the second shard;
deleting a second set of existing documents from the third shard;
creating the third shard as a new shard;
resuming the second shard; and
continue adding the document to the second shard or the third shard;
wherein the first subset and the second subset are respectively allocated to the first shard and the second shard based on a shard-slot mapping.

16. The data processing system of claim 15, wherein
the first subset of the slots includes a first slot assigned with a first minimum slot number, and a second slot assigned with a first maximum slot number,
the second subset of the slots includes a third slot assigned with a second minimum slot number, and a fourth slot assigned with a second maximum slot number.

17. The data processing system of claim 15, wherein the operations further comprise: in response to a request to index a document, determining one of the plurality of slots to store the document by performing a modulus operation between a hash value of a document identifier (ID) of the document and a total number of slots to determine the slot number assigned to the slot to store the document.

18. The data processing system of claim 17, wherein the hash value is represented by a plurality of bits, and the slot number is identified by some of the plurality of bits.

19. The data processing system of claim 15,
wherein the slot numbers that host the deleted first set of existing documents are held by the new shard;
wherein the slot numbers that host the deleted second set of existing documents are held by the second shard.

20. The data processing system of claim 15, wherein the prefer shard size is determined based on a maximum shard suspend time and a reallocation speed.

21. The data processing system of claim 15, wherein the plurality of slots comprises $2^N$ slots, wherein N is the slot power value greater than or equal to zero (0).

* * * * *